(12) United States Patent
Kreiner et al.

(10) Patent No.: US 11,967,147 B2
(45) Date of Patent: Apr. 23, 2024

(54) AUGMENTED REALITY VISUALIZATION OF ENCLOSED SPACES

(71) Applicant: AT&T Intellectual Property I, L.P., Atlanta, GA (US)

(72) Inventors: Barrett Kreiner, Woodstock, GA (US); James Pratt, Round Rock, TX (US); Adrianne Binh Luu, Atlanta, GA (US); Robert T. Moton, Jr., Alpharetta, GA (US); Walter Cooper Chastain, Atlanta, GA (US); Ari Craine, Marietta, GA (US); Robert Koch, Peachtree Corners, GA (US)

(73) Assignee: AT&T Intellectual Proerty I, L.P., Atlanta, GA (US)

( * ) Notice: Subject to any disclaimer, the term of this patent is extended or adjusted under 35 U.S.C. 154(b) by 0 days.

(21) Appl. No.: 17/492,184

(22) Filed: Oct. 1, 2021

(65) Prior Publication Data

US 2023/0107590 A1    Apr. 6, 2023

(51) Int. Cl.
| | |
|---|---|
| *G06V 20/20* | (2022.01) |
| *G06T 11/00* | (2006.01) |
| *G06T 11/60* | (2006.01) |
| *G07C 9/23* | (2020.01) |

(52) U.S. Cl.
CPC .............. *G06V 20/20* (2022.01); *G06T 11/00* (2013.01); *G06T 11/60* (2013.01); *G07C 9/23* (2020.01)

(58) Field of Classification Search
CPC ............ G06V 20/20; G06T 11/00; G07C 9/23
See application file for complete search history.

(56) References Cited

U.S. PATENT DOCUMENTS

| | | | | |
|---|---|---|---|---|
| 8,659,429 | B1* | 2/2014 | Wagner ................ | G01S 13/876 340/572.1 |
| 9,092,896 | B2* | 7/2015 | Scavezze ............. | G06T 19/006 |
| 9,116,666 | B2* | 8/2015 | Salter ..................... | G06F 3/017 |
| 11,016,630 | B2* | 5/2021 | Liu ...................... | G06F 3/04815 |
| 11,252,329 | B1* | 2/2022 | Cier ..................... | G06V 10/454 |
| 11,280,619 | B1* | 3/2022 | Scheper ................. | H04W 4/30 |

(Continued)

FOREIGN PATENT DOCUMENTS

CN    110708530 A    *    1/2020    ........... H04N 13/204

OTHER PUBLICATIONS

William, J., "Augmented Reality: A Recent Technology Debut in Hotel Industry", Hotelier Academy, Sep. 30, 2019, printed from https://www.hotelieracademy.org/augmented-reality-a-recent-technology-debut-in-hotel-industry/, 15 pages.

(Continued)

*Primary Examiner* — Motilewa Good-Johnson (57) ABSTRACT

A processing system including at least one processor may detect a first location and a first orientation of an augmented reality endpoint device of a user at a venue, identify an entryway of a first enclosed space of the venue that is within a first field-of-view of the augmented reality endpoint device in accordance with the first location and the first orientation of the augmented reality endpoint device, and present, via the augmented reality endpoint device, first visual information of the first enclosed space. The first visual information may include first imagery of the first enclosed space and may be presented within the first field-of-view.

20 Claims, 4 Drawing Sheets

(56) References Cited

U.S. PATENT DOCUMENTS

| | | | | | |
|---|---|---|---|---|---|
| 2012/0200601 | A1* | 8/2012 | Osterhout | | G02B 27/017 |
| | | | | | 345/633 |
| 2013/0044128 | A1* | 2/2013 | Liu | | G02B 27/017 |
| | | | | | 345/633 |
| 2013/0127980 | A1* | 5/2013 | Haddick | | G06F 3/013 |
| | | | | | 348/14.08 |
| 2013/0321462 | A1* | 12/2013 | Salter | | G06F 1/163 |
| | | | | | 345/633 |
| 2013/0328930 | A1* | 12/2013 | Lee | | G06T 19/006 |
| | | | | | 345/633 |
| 2013/0342568 | A1* | 12/2013 | Ambrus | | G09G 3/003 |
| | | | | | 345/633 |
| 2014/0063055 | A1* | 3/2014 | Osterhout | | G06T 19/006 |
| | | | | | 345/633 |
| 2015/0156028 | A1* | 6/2015 | Ballard | | G06F 3/04812 |
| | | | | | 709/204 |
| 2016/0042566 | A1* | 2/2016 | Mao | | A63F 13/213 |
| | | | | | 463/31 |
| 2016/0098579 | A1* | 4/2016 | Ballard | | H04L 67/52 |
| | | | | | 726/27 |
| 2017/0115742 | A1* | 4/2017 | Xing | | G06F 3/0485 |
| 2018/0035101 | A1* | 2/2018 | Osterhout | | G02B 27/0172 |
| 2018/0089869 | A1* | 3/2018 | Bostick | | G06V 10/751 |
| 2018/0204386 | A1* | 7/2018 | Chen | | G06F 3/011 |
| 2018/0240274 | A1* | 8/2018 | Cronin | | G06Q 50/12 |
| 2019/0114839 | A1* | 4/2019 | Mott | | G06F 3/04815 |
| 2019/0121522 | A1* | 4/2019 | Davis | | H04N 9/3147 |
| 2019/0279429 | A1* | 9/2019 | Chen | | G06F 3/011 |
| 2019/0370700 | A1* | 12/2019 | Ludwig | | G06Q 10/00 |
| 2020/0096346 | A1* | 3/2020 | Dhandapani | | G01C 21/383 |
| 2020/0097093 | A1* | 3/2020 | Katz | | G06T 19/006 |
| 2020/0110934 | A1* | 4/2020 | Paul | | H04W 4/33 |
| 2020/0311428 | A1* | 10/2020 | Rom | | G06T 15/04 |
| 2020/0349785 | A1* | 11/2020 | Kuenzi | | G07C 9/00571 |
| 2020/0351661 | A1* | 11/2020 | Kuenzi | | H04W 12/08 |
| 2021/0201584 | A1* | 7/2021 | Ha | | G06T 19/006 |
| 2021/0225042 | A1* | 7/2021 | Waltermann | | G06T 11/00 |
| 2022/0050936 | A1* | 2/2022 | Kincart | | G06Q 30/0643 |
| 2022/0194704 | A1* | 6/2022 | Fosnight | | B65G 1/065 |
| 2022/0214036 | A1* | 7/2022 | Hodge | | F21V 33/0076 |

OTHER PUBLICATIONS

Hospitality Magazine (HT, "How Hotels Are Using Beacons and Augmented Reality", Dec. 14, 205, printed from *How Hotels Are Using Beacons and Augmented Reality | News | Hospitality Magazine (HT) (hospitalitytech.com)*, 3 pages.

* cited by examiner

AUGMENTED REALITY VISUALIZATION OF ENCLOSED SPACES

The present disclosure relates generally to augmented reality devices and systems, and more particularly to methods, computer-readable media, and apparatuses for presenting visual information comprising imagery of an enclosed space via an augmented reality endpoint device in response to identifying an entryway of the enclosed space within a field of view.

BACKGROUND

The use of augmented reality (AR) and/or mixed reality (MR) applications is increasing. In one example, an AR endpoint device may comprise smart glasses with AR enhancement capabilities. For example, the glasses may have a screen and a reflector to project outlining, highlighting, or other visual markers to the eye(s) of a user to be perceived in conjunction with the surroundings. The glasses may also comprise an outward facing camera to capture video of the physical environment from a field-of-view in a direction that the user is looking.

SUMMARY

In one example, the present disclosure describes a method, computer-readable medium, and apparatus for presenting visual information comprising imagery of an enclosed space via an augmented reality endpoint device in response to identifying an entryway of the enclosed space within a field of view. For instance, in one example, a processing system including at least one processor may detect a first location and a first orientation of an augmented reality endpoint device of a user at a venue, identify an entryway of a first enclosed space of the venue that is within a first field-of-view of the augmented reality endpoint device in accordance with the first location and the first orientation of the augmented reality endpoint device, and present, via the augmented reality endpoint device, first visual information of the first enclosed space. The first visual information may include first imagery of the first enclosed space and may be presented within the first field-of-view.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Examples of the present disclosure describe methods, computer-readable media, and apparatuses for presenting visual information comprising imagery of an enclosed space via an augmented reality endpoint device in response to identifying an entryway of the enclosed space within a field of view. Usage of augmented reality (AR) and/or mixed reality (MR) applications is ever increasing. In one example, an AR endpoint device may comprise smart eyewear, e.g., smart glasses, smart goggles, smart face shields, or smart headsets, with AR enhancement capabilities. For example, the smart glasses may have a screen and a reflector to project outlining, highlighting, or other visual markers to the eye(s) of a user to be perceived in conjunction with the surroundings. The smart glasses may also comprise an outward facing camera to capture video of the physical environment from a field-of-view in a direction that the user is looking, which may be used in connection with detecting various objects or other items that may be of interest in the physical environment, determining when and where to place AR content within the field-of-view, and so on. In addition, an AR endpoint device may be equipped with a Global Positioning System (GPS) unit, a gyroscope, a compass, an altimeter, one or more accelerometers, and so forth in order to determine a position/location and orientation information, which may be further used in determining when and where to place AR content within the field-of-view.

Examples of the present disclosure enable an AR-based experience for a user to view and access enclosed spaces within a venue. For instance, a user may book a facility, such as a hotel room, by observing an AR representation of the room from outside the room, but proximate to the room. The user may also be presented with an AR representation of other rooms in the immediate vicinity, without current physical access the rooms, i.e., without physically entering the rooms. In one example, a user may be provided with a first-level access to rooms available for selection (e.g., AR-based access), and a second-level access to a specific room, once selected (e.g., physical access). In various examples, the venue can be a hotel, a motel, or similar accommodations, but may also be a shared office space (e.g., where the enclosed spaces/rooms may be specific offices or suites to be used for one or more hours, days, weeks, etc.), may be an entertainment and/or sporting venue (e.g., where the enclosed spaces/rooms may be luxury boxes at an theater, arena, stadium, or the like), may be a cabin on a train or cruise ship (e.g., where the enclosed spaces may be private sleeping rooms), and so on. However, for illustrative purposes, the present disclosure is described primarily in connection with examples relating to a hotel and rooms therein. It should also be understood that when referring to "a room" or "the room," the terms may encompass an enclosed space that includes one or more separate bathrooms, one or more separate sleeping spaces, or the like which adjoin each other and which are accessible from an entryway from a non-exclusive space (e.g., a suite comprising one, two, or several bedrooms, one or more bathrooms, etc. that may be accessed from a shared hallway).

In one example, a user may make a reservation for a type of room without reserving a specific room. For instance, using an application (app) on a mobile computing device, using a website associated with the venue via a mobile computing device, personal computer, or the like, the user may reserve a queen bedroom unit at a certain venue of a lodging provider, but not a specific unit at that venue. The reservation may be saved in a reservations database, including a user identifier (ID), date(s) of the reservation, and a quoted price range for the dates selected. The specific price may be determined later, when a specific unit is actually chosen. When the user arrives at the venue, the user's location may be detected via the user's mobile computing device and communicated to a processing system of the lodging provider via the app. In one example, the lodging provider may present an option for the patron to check-in via the app.

Upon check-in, the lodging provider processing system may query the user database and/or the user's reservation from a reservations database to determine available rooms that meet the requirements of the user reservation. In response, a display of available inventory may be presented to the user via the app. Checking-in may also result in a "first-level access key" being sent to the app, which may enable the app for finalizing a room booking process. After the user books a room, the "first-level access key" may be disabled. In accordance with the present disclosure, the user may be equipped with an AR viewer, such as AR glasses/ headset, or an AR viewer app on the user's mobile computing device (in other words, in one example, the mobile computing device may be an AR viewer). In one example, the AR viewer app may be part of the lodging provider app, or may be accessible to the lodging provider app (e.g., via one or more application programming interfaces (APIs) made available by a separate AR viewer app). The AR viewer may include an audio speaker and/or earphone(s), a microphone, an outward facing camera, and so forth. The AR glasses and other devices may be connected to the lodging provider processing system (e.g., one or more servers) over one or more networks.

In one example, one or more AR markers (e.g., AR anchors, or anchor points) may be associated with locations throughout the venue for the AR viewer to use to orient itself within the environment. Other approaches, such as markerless or location-based AR may be used as well. In one example, by detecting one or more AR anchor points and determining their relative locations to the AR viewer, the AR viewer may identify where it is within the venue and what is within the field-of-view of the user at a given point in time. For instance, AR anchor points for each room may be used by the AR viewer to create a real-time map of the field-of-view. This map need not be displayed to the user, but rather is used for orientation purposes.

With the AR viewer's location and orientation within the venue being determined, the AR viewer and/or the lodging provider processing system may determine which AR content to present to the user, and where within the field-of-view to present the AR content, e.g., in relation to the one or more AR anchor points. For example, the user may be in a hallway approaching several rooms. With the location and orientation known, visual information (or "AR content") for each room may be presented within the field-of-view, e.g., on or proximate to the doors of the respective rooms. In one example, the lodging provider processing system may access data from a user database and/or a reservations database to determine and to present AR content indicating whether each room is currently available and/or unavailable (e.g., in one example occupied and unoccupied rooms are both indicated by AR content; in another example, only available rooms may be presented with associated AR content).

Continuing with the present example, the user may approach closer to the door of a particular room. When the user is oriented at the door (e.g., as determined from the location and orientation information of the AR viewer) an AR view comprising AR content of the interior of the room may be presented to the user via the AR viewer, e.g., the AR content comprising imagery of the room previously captured from a perspective of the door of the room and facing into the room. For example, the imagery may provide an AR "x-ray" view. In one example, additional images/views may be available (e.g., that are not necessarily from the perspective of the door looking into the room). In one example, the user may request the display of a different image, for instance via a spoken command to the app via the microphone of the AR viewer and/or a separate associated mobile computing device. The images may be retrieved from an AR content database or other repositories associated with the venue. In one example, additional information may also be displayed as AR content for viewing by the user, such as a cost for the room, data describing the last occupancy date, e.g., as recorded in a reservations database, features of the room (such as having a coffee maker, a refrigerator, a safe, a particular type of linens, a pull-out sofa, or similar features, available space to accommodate a roll-in bed or crib, which in some cases may not be immediately apparent from viewing image(s) of the room).

The user may obtain AR views of one or several rooms in this way. To select a specific room, the user may utter a command such as "book this room," or may enter an input via a gesture captured via a camera of the AR viewer and interpreted by the AR viewer and/or by uploading the recorded video from the camera for interpretation by the lodging provider processing system. In another example, the available rooms may be made physically accessible to the user. However, upon entering any particular room, the room may be assigned to/reserved for the user, and the user's authorization to enter any other available rooms may be revoked. Similarly, the ability of other users to enter the room selected by the user may also be revoked. In one example, the lodging provider processing system may update a reservation entry for the patron in a reservations database and/or a user database. In one example, a specific access credential may be sent to the user's mobile computing device and/or AR viewer to enable access to the selected room. In one example, a corresponding instruction may be sent to a smart lock of the door of the room. The access credential may comprise an electronic key code that may be presented via a wireless signal from the user's device(s) to the smart lock, or may comprise a code that may be entered via a keypad of the smart door lock. Alternatively, or in addition, the access credential may comprise an international mobile subscriber identity (IMSI) or international mobile equipment identity (IMEI) of the user's AR viewer and/or an associated mobile computing device, the MAC address or other hardware ID, or the like, a unique identifier of the user's instance of a venue app (e.g., generated and provided along with the venue app software at a time of installation of the app), or the like. These and other aspects of the present disclosure are discussed in greater detail below in connection with the examples of FIGS. 1-4.

Figure 1:
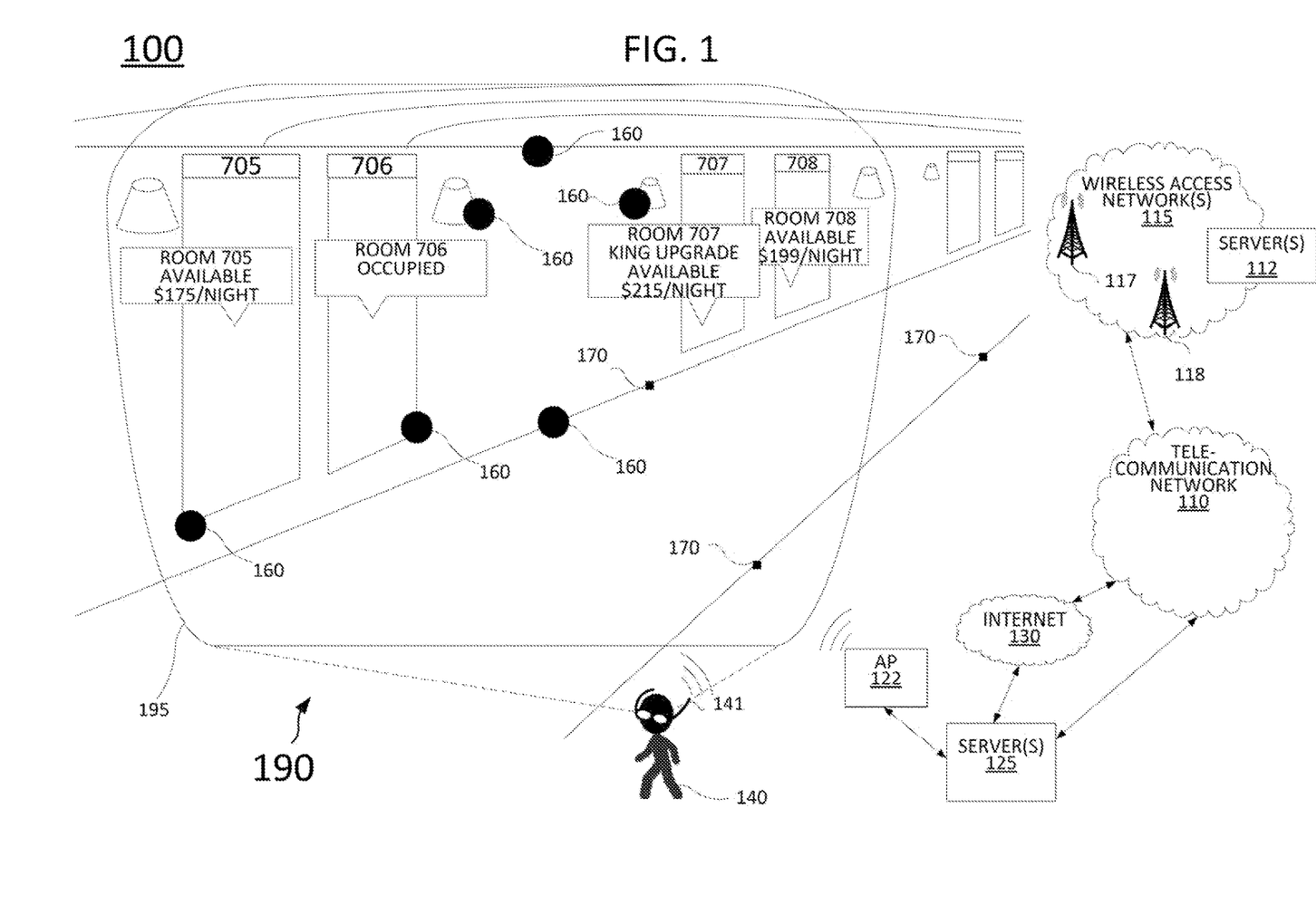
FIG. 1 illustrates an example system related to the present disclosure.

To aid in understanding the present disclosure, FIG. 1 illustrates an example system 100, related to the present disclosure. As shown in FIG. 1, the system 100 connects mobile computing device 141, server(s) 112, server(s) 125, wireless beacons/sensors 170, and so forth with one another and with various other devices via a core network, e.g., a telecommunication network 110, a wireless access network 115 (e.g., a cellular network), and Internet 130. It should be noted that although the system 100 may support numerous user devices/mobile computing devices, for illustrative purposes only mobile computing device 141 is shown in FIG. 1.

Figure 3:
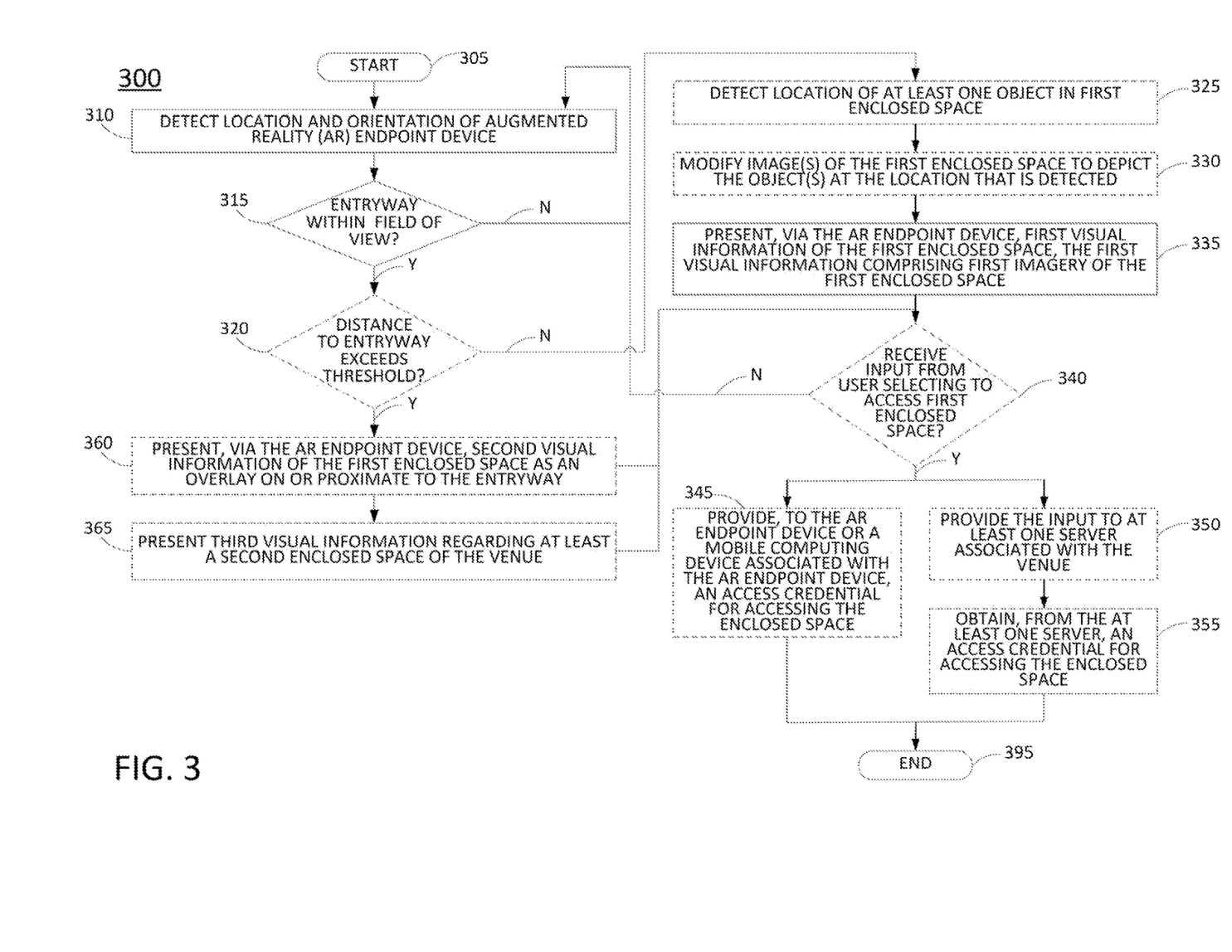
FIG. 3 illustrates a flowchart of an example method for presenting visual information comprising imagery of an enclosed space via an augmented reality endpoint device in response to identifying an entryway of the enclosed space within a field of view.
Figure 4:
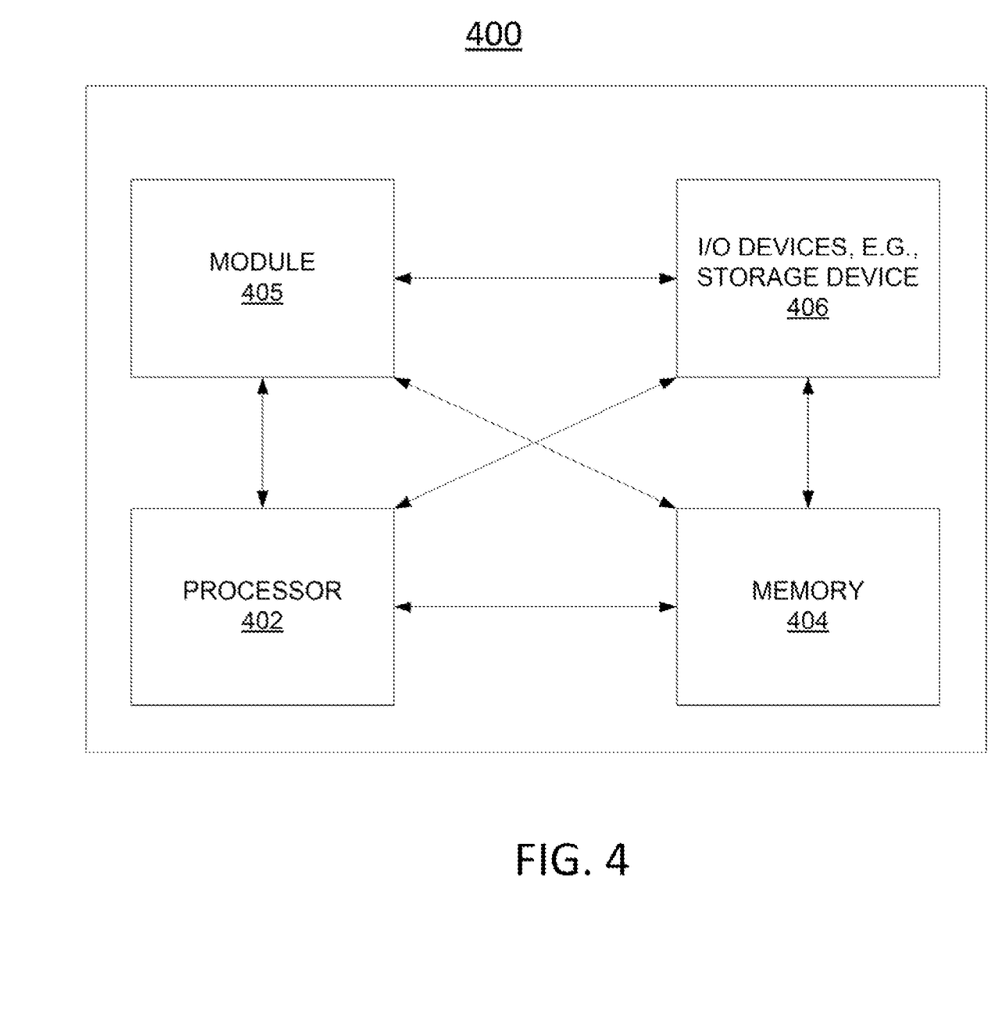
FIG. 4 illustrates an example high-level block diagram of a computing device specifically programmed to perform the steps, functions, blocks, and/or operations described herein.

In one example, the server(s) 125 may each comprise a computing device or processing system, such as computing system 400 depicted in FIG. 4, and may be configured to perform one or more steps, functions, or operations for presenting visual information comprising imagery of an enclosed space via an augmented reality endpoint device in response to identifying an entryway of the enclosed space within a field of view, such as illustrated in FIG. 3 and described below. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 4 and discussed below) or multiple computing devices collectively configured to perform various steps, functions, and/or operations in accordance with the present disclosure.

In one example, server(s) 125 may comprise a venue management system, which in one example may include a facility database, a reservations database, a user/patron database, and/or an AR mapping and content database. For instance, server(s) 125 may receive and store in the facility database: location/position information for each room in a hotel (e.g., in two or three dimensional coordinates, by floor, hallway, etc.), room amenity information, such as type of bed(s), types of television(s), linen type(s), bathroom configuration (e.g., tub, shower, tub/shower combo, rain shower, etc.), views, price category, available space for a roll-in bed or crib, smoking or non-smoking, and so forth. Server(s) 125 may receive and store in the reservations database: room occupancy information (e.g., whether the room is or is not occupied at a current time, and/or whether or not the room is specifically reserved for a future time), and so on. In one example, the room occupancy information may be cross-referenced with the user/patron database (e.g., thereby associating reservations with particular users, facilitating updating of both databases when a user reservation changes, and so forth). For instance, a user ID may be associated with the occupancy/reservation information in the reservations database, where the user ID may be used to retrieve the corresponding user data from the user database. In this regard, the user database may include records for each user, such as user 140, comprising: a name, username(s) to login to a venue app, mobile device identifier(s) (such as a phone number, IMSI, IMEI, or the like of mobile computing device 141 of user 140), any reservations for current or upcoming dates, times, and/or events at the venue 190 (or at other facilities of a same lodging provider), current charges or balances, any current offers or temporarily reserved rooms for the user 141 at the venue 190 (e.g., for in-person upgrades offers), and so on.

In one example, server(s) 125 may store, e.g., in the AR mapping and content database, location data of wireless beacons/sensors 170 of venue 190, such as Institute of Electrical and Electronics Engineers (IEEE) 802.15 based-beacons. Alternatively, or in addition, server(s) 125 may store an AR anchor map, e.g., a database of locations of AR anchors/reference points 160 for the venue 190 e.g., each having a position with a fixed spatial relationship to visual features of the venue 190, such as corners where walls meet floors or ceilings, sconces, door frames, and so forth (e.g., where the venue 190 may comprise hotel, and similarly with respect to distinctive visual features for other types of venues, such as theaters, stadiums, arenas, etc.). In one example, each AR anchor/reference point may include keypoint descriptors which enable detection of the same AR anchor/reference point in multiple images and from varying perspectives.

The keypoint descriptors for AR anchors 160 may be specific to particular types of visual/image and/or spatial sensor data, or may be associated with multiple types of sensor data as inputs. For instance, with respect to images or video, the input sensor data may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like. For instance, these features could be used to help quantify and distinguish plastic seats from a concrete floor, metal railings, etc. Other features may be based upon light detection and ranging (LiDAR) input data, infrared camera input data, and so on.

The AR content and mapping database may also include AR content and associated location/placement data for such AR content, e.g., in relation to the AR anchor/reference points. For instance, as noted above, the present disclosure may maintain image(s) of a room that may be presented as AR content when the user is physically present outside the door to the room and additionally may include information such as a cost of the room, amenities of the room, or other alphanumeric information/data. In one example, the AR content for each room may include a template with fields that may change, such as different prices for different dates, different prices for different categories of patrons (e.g., frequent guests may have a different rate, users traveling on business for a particular employer (e.g., a company having a previously negotiated rate for its employees) may have another rate, etc.), or may be personalized to a user's interests with the consent of the user 140 (e.g., in one example, if the user prefers quiet, AR content may be tailored to include an indication that a room faces a pool, which may affect the choice of user 140 whether or not to select the particular room; in another example, if the user is concerned with pathogens, information regarding when the room was last occupied may be presented, and so on).

In one example, server(s) 125 may provide the AR anchor map, or portions thereof, to user devices, such as mobile computing device 141, in order to detect relevant visual features in the venue 190. For instance, mobile computing device 141 may perform simultaneous localization and mapping (SLAM) using the AR anchor map and images and/or video captured from an outward facing camera of mobile computing device 141. In one example, the SLAM process may also incorporate and use location and/or orientation data of mobile computing device 141. For instance, using an integral global positioning system (GPS) unit, altimeter, gyroscope, and compass, mobile computing device may 141 may track its position and orientation within the 3D environment of venue 190. Alternatively, or in addition, mobile computing device 141 may determine its position/location via triangulation or via similar calculation with respect to wireless beacons/sensors 170.

In one example, the system 100 includes a telecommunication network 110. In one example, telecommunication network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication network 110 uses a network function virtualization infrastructure (NFVI), e.g., host devices or servers that are available as host devices to host virtual machines comprising virtual network functions (VNFs). In other words, at least a portion of the telecommunication network 110 may incorporate software-defined network (SDN) components.

In one example, one or more wireless access networks 115 may each comprise a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network(s) 115 may each comprise an access network in accordance with any "second generation" (2G), "third generation" (3G), "fourth generation" (4G), Long Term Evolution (LTE), "fifth generation" (5G), or any other existing or yet to be developed future wireless/cellular network technology. While the present disclosure is not limited to any particular type of wireless access network, in the illustrative example, base stations 117 and 118 may each comprise a Node B, evolved Node B (eNodeB), or gNodeB (gNB), or any combination thereof providing a multi-generational/multi-technology-capable base station. In the present example, mobile computing device 141 may be in communication with base stations 117 and 118, which provide connectivity between mobile computing device 141 and other endpoint devices within the system 100, various network-based devices, such as server(s) 112, server(s) 125, and so forth. In one example, wireless access network(s) 115 may be operated by the same service provider that is operating telecommunication network 110, or one or more other service providers.

For instance, as shown in FIG. 1, wireless access network(s) 115 may also include one or more servers 112, e.g., edge servers at or near the network edge. In one example, each of the server(s) 112 may comprise a computing device or processing system, such as computing system 400 depicted in FIG. 4 and may be configured to provide one or more functions in support of examples of the present disclosure for presenting visual information comprising imagery of an enclosed space via an augmented reality endpoint device in response to identifying an entryway of the enclosed space within a field of view. For example, one or more of the server(s) 112 may be configured to perform one or more steps, functions, or operations in connection with the example method 300 described below. For instance, telecommunication network 110 may provide a venue management system, e.g., as a service to one or more subscribers/customers, in addition to telephony services, data communication services, television services, etc. In one example, server(s) 112 may operate in conjunction with server(s) 125. For instance, server(s) 112 may manage AR mapping data while server(s) 125 may primarily manage a user database, a reservations database, etc., e.g., operated by the venue 190. It is noted that this is just one example of a possible distributed architecture for a venue management system and/or a network-based venue management support service. Thus, various other configurations including various data centers, public and/or private cloud servers, and so forth may be deployed. For ease of illustration, various additional elements of wireless access network(s) 115 are omitted from FIG. 1.

As illustrated in FIG. 1, mobile computing device 141 may comprise an AR endpoint device, for example, a cellular telephone, a smartphone, a tablet computing device, a laptop computer, a head-mounted computing device (e.g., smart glasses), a wireless enabled wristwatch, or any other wireless and/or cellular-capable mobile telephony and computing devices (broadly, a "mobile device" or "mobile endpoint device"). In one example, mobile computing device 141 may be equipped for cellular and non-cellular wireless communication, such as 4G/Long Term Evolution-based cellular communication, 5G cellular communications, Institute of Electrical and Electronics Engineers (IEEE) 802.11 based communications (e.g., Wi-Fi, Wi-Fi Direct), IEEE 802.15 based communications (e.g., Bluetooth, Bluetooth Low Energy (BLE), and/or ZigBee communications), and so forth. In accordance with the present disclosure, mobile computing device may include an outward facing camera, a microphone, at least one speaker (e.g., at least one earpiece), a light detection and ranging (LiDAR) unit, a global positioning system (GPS) unit, an altimeter, a gyroscope, a compass, and so forth. In one example, mobile computing device 141 may comprise a pair of smart glasses with augmented reality (AR) enhancement capabilities. For example, mobile computing device 141 may have a screen and a reflector to project outlining, highlighting, or other visual markers to the eye(s) of user 140 to be perceived in conjunction with the surroundings.

In addition, mobile computing device 141 may include an on-board processing system to perform steps, functions, and/or operations in connection with examples of the present disclosure for presenting visual information comprising imagery of an enclosed space via an augmented reality endpoint device in response to identifying an entryway of the enclosed space within a field of view. For instance, mobile computing device 141 may comprise all or a portion of a computing device or processing system, such as computing system 400 as described in connection with FIG. 4 below, specifically configured to perform various steps, functions, and/or operations as described herein. It should be noted that in another example, user 140 may be equipped with a non-standalone AR device (e.g., smart glasses) that are paired with a smartphone or similar mobile computing device. However, for illustrative purposes FIG. 1 shows an example where mobile computing device 141 is independently capable of presenting a user interface, operating a client-side portion of a venue app, communicating with remote servers, such as server 125, and so forth.

In an illustrative example, user 140 having mobile computing device 141 may be at venue 190. The mobile computing device 141 may be in communication with server(s) 125, e.g., over a cellular connection via one of the base stations 117 or 118, telecommunication network 110, Internet 130, etc., via a non-cellular wireless connection with AP 122, e.g., where AP 122 and server(s) 125 may be part of a same local area network (LAN) or intranet of an operator of venue 190, or the like. In one example, mobile computing device 141 may communicate with server(s) 125 in accordance with a venue app installed and in operation on mobile computing device 141. For instance, user 140 may first check-in at the venue 190 via the app. In one example, the user 140 may have a reservation for a particular type of room (e.g., a "queen room") without having being assigned or selected a specific room at the venue 190, thereby allowing the user 140 the freedom and flexibility of selecting a room upon arriving at the venue 190. In one example, upon check-in, server(s) 125 may provide a "first-level access key" to the mobile computing device 141, which may enable access to AR content for relevant rooms in the venue 190 and the finalizing of a room booking process via the app. For instance, in one example, the user 140 may be provided with a list and/or a general map of available rooms (e.g., available "queen rooms" and/or additionally available room that may be upgrade options, such as "king rooms," "executive suites," etc.), and may be directed toward one or more of these rooms, e.g., by oral directions from staff of venue 190, by general directions via the app, such as "take an elevator to floor 7," etc. In one example, the "first-level access key" may be used via the elevator, or hall doors to access a particular floor, wing, or other areas of the venue 190. For instance, if the first-level access key comprises a key code/passcode, the user may enter a passcode via a touchscreen or keypad of the elevator, hall door, turnstile, etc. If the first-level access key comprises an electronic/wireless key code, the mobile computing device 141 may wirelessly transmit/broadcast such key code for detection/sensing by a smart lock of the elevator, hall door, or the like.

Mobile computing device 141 may capture images/video of the environment of venue 190, which mobile computing device 141 may use to perform a SLAM process as noted above. For instance, server(s) 125 may provide a venue map to mobile computing device 141 that includes information regarding AR anchors/reference points 160, including key-point descriptors, e.g., a signature for respective anchor points, which may be used by mobile computing device 141 to determine its location and orientation, and any of the AR anchors 160 currently within view of the mobile computing device 141. In one example, mobile computing device 141 may further use location and/or orientation information, LiDAR, or similar data that may be available depending upon the capabilities of mobile computing device 141 and/or the extent to which such additional data may comprise part of the signatures for the AR anchors 160.

In one example, server(s) 125 may also provide AR content for rendering/display via mobile computing device 141 in association with various visual features that may be within the field-of-view as determined in accordance with detected ones of the AR anchors 160. In one example, some or all of the AR content may be provided in advance (e.g., before detecting specific AR anchor(s)). Alternatively, mobile computing device 141 may communicate detected anchor points and/or their location and orientation information to server(s) 125, in response to which server(s) 125 may provide any corresponding AR content for display within the current field-of-view, or an anticipated field-of-view based upon one or more recent viewports (e.g., determining a trajectory of the viewport or field-of-view based upon the viewport/field-of-view over one or more prior points in time).

For instance, as illustrated in FIG. 1, user 140 may be on a hallway on the seventh floor of the venue 190 where several room doors may be within the field-of-view 195 (e.g., rooms 705-708). The location and orientation of mobile computing device 141 may be detected in relation to one or more of the AR anchors 160. In this case, server(s) 125 may provide AR content comprising visual information relating to rooms 705-708 for rendering/display via mobile computing device 141. In one example, all or several of the room doors within the field-of-view 195 may have overlaid/projected text boxes with room information, such as room number, whether the room is available or occupied, a cost for the room, etc. The AR content may include location and/or orientation data to enable mobile computing device 141 to project the visual information in the correct spatial location with respect to the doors of rooms 705-708 (e.g., in accordance with location and spatial orientation information with respect to one or more of the AR anchors 160). The AR content, e.g., text boxes, may have coloring, shading, or other features added, such as different colors for different room types, different colors for occupied and unoccupied rooms, and so forth. In one example, one or more portions of the AR content may be personalized to the user 140 by server(s) 125. For instance, user 140 may be a frequent visitor to the venue 190 and may be presented with different offers for room prices as compared to other users, the user 140 may have a reservation for a particular room type, and thus rooms of this type may be presented with AR content in a particular color, whereas upgrade options may be a different color (and where users having reservations for rooms of another type may have different color coding presented for the same rooms as compared to user 140).

Figure 2:
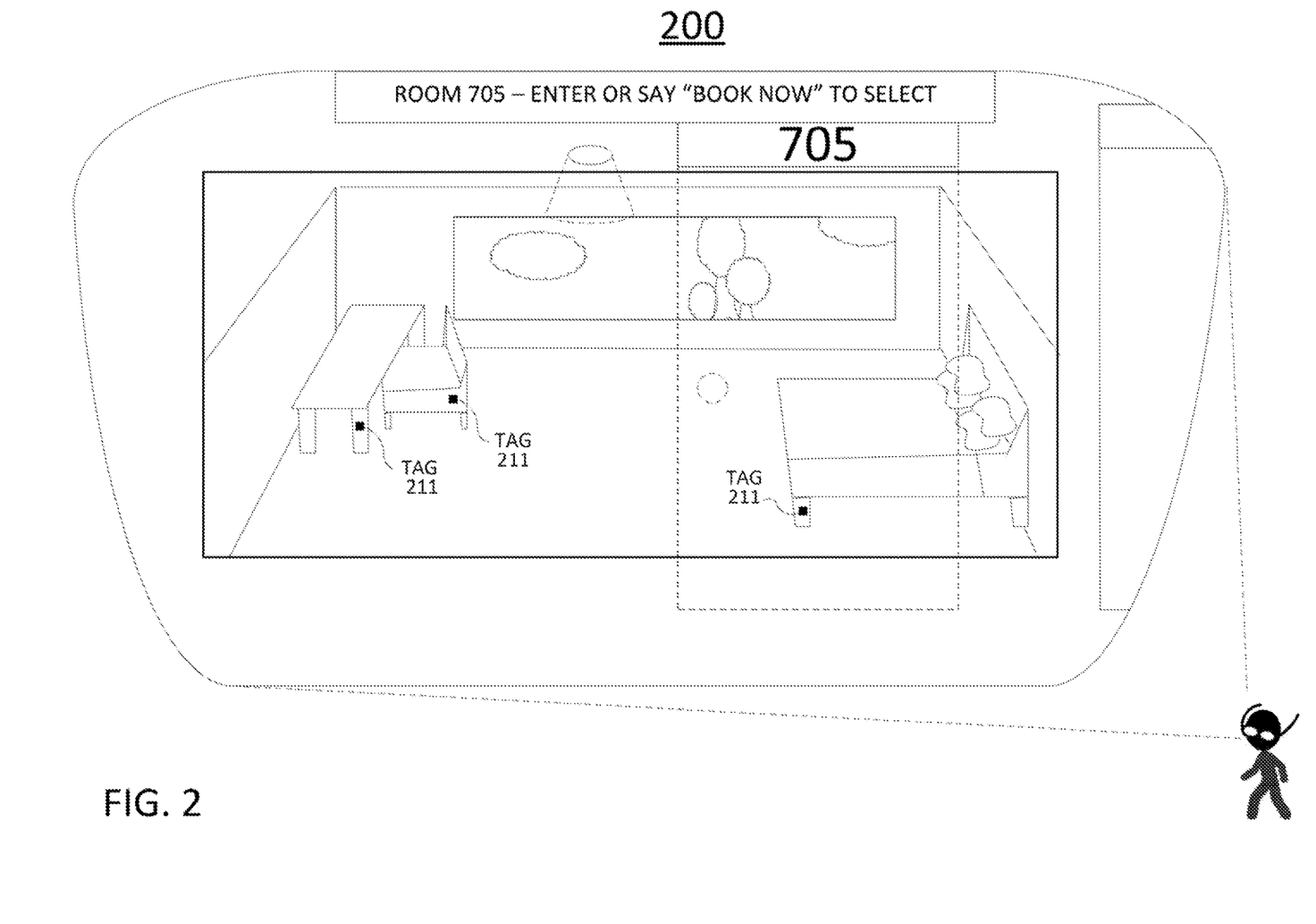
FIG. 2 illustrates examples of an augmented reality view of a venue, in accordance with the present disclosure.

Referring now to FIG. 2, in one example, more specific AR content may be provided for display via mobile computing device 141 as the user 140 moves closer to a door to a particular room (such as in accordance with the example AR view 200 of FIG. 2). For example, user 140 may approach and face the door to room 705, in response to which more detailed AR content (also referred to herein as "visual information" e.g., "first imagery") may be made available by server(s) 125 and/or mobile computing device 141 for display to user 140. The presence of user 140 in front of the door to room 705 may be detected in the same manner as described above, e.g., via visual analysis to determine the orientation of mobile computing device 141 and the corresponding field-of-view in relation to one or more of the AR anchors 160 (and alternatively or additional using GPS location data, altimeter location data, location data in relation to wireless beacons/sensors 170, orientation data from a gyroscope and compass of mobile computing device 141, etc.). The AR content in the AR view 200 of FIG. 2 may have been pre-loaded to the mobile computing device 141 and retrieved for presentation by the mobile computing device 141 when the user 140 and/or mobile computing device 141 is determined to be proximate to the door to room 705. Alternatively, the mobile computing device 141 may provide visual data, location data, and/or orientation data to server(s) 125 which may determine that the door to room 705 is within view, and that the mobile computing device 141 is sufficiently close (and/or the door to room 705 is sufficiently large within the field-of-view) such that the AR content shown in the AR view 200 may be provided to the mobile computing device 141 for presentation.

In the example of FIG. 2, the AR content may include overlay imagery of the room 705, which shows a bed, table, chair, window, and walls. In addition, the AR content may include alphanumeric data regarding the room 705. For instance, the AR content may include the room number (e.g., "room 705") as well as instructions on how to select the room (e.g., "enter or say 'book now' to select room 705").

Notably, the example of FIG. 2 demonstrates that a user may be provided with a virtual view into a room without actually entering the room. The example of FIG. 2 further illustrates that moveable objects/items within an enclosed space, such as room 705, may be equipped with wireless tags 211 (e.g., radio frequency identification (RFID) tags), modules for IEEE 802.15 wireless sensing/detecting (e.g., Bluetooth, Bluetooth Low Energy (BLE), or the like), and so on. For instance, the locations of moveable objects within room 705 may be detected, and these objects may be depicted in their current locations within the AR content provided to mobile computing device 141 and presented within the AR view 200. For example, AR mapping and content database may include image(s) of room 705 captured at some earlier time. However, the bed, table, chair, and/or other objects in room 705 may have been moved from whichever positions these objects were in at the time of capturing the image(s).

In one example, server(s) 125 may determine the current locations and/or orientations of these objects, e.g., via location reporting by tags 211, via location sensing of tags 111 via RFID readers (such as wireless beacons/sensors 170 deployed throughout venue 190), and so forth. In one example, the moveable objects may each include multiple tags to facilitate more accurate orientation detection. Server(s) 125 may then modify at least one image of the room 705 to depict the moveable object(s)/item(s) at the location(s) that is/are detected. In other words, the modified image(s) may comprise the AR content/visual information that is provided to the mobile computing device 141 and shown in the example AR view 200 of FIG. 2. For example, server(s) 125 may maintain object models for these moveable objects. The object models may include visual data of these objects from different perspectives/orientations such that the objects may be placed into a scene in any orientation, with any sizing, etc.

In one example, room images, such as of room 705 may be maintained in the AR mapping and content database in a format without moveable objects. For instance, the images may be captured at times when the rooms are devoid of these moveable objects. Alternatively, or in addition, images of the rooms may be captured and may then be processed by server(s) 125 or via a different processing system to identify and remove imagery of these movable objects. For instance, object detection and/or recognition models may be applied to the image(s) to identify the bounds of moveable objects (and in one example, to further detect the types of such objects). In one example, the resulting visual data may then be further manipulated such as using a generative adversarial network (GAN) or similar machine learning (ML)-based process to fill in (or "infill") missing spaces of the extracted items/objects. In addition, in one example, a GAN or the like may be applied to the visual data of the extracted objects to generate object models (e.g., 3D object models) that may then be used to replicate these items in any orientation (e.g., when re-inserting imagery of these objects into the room image(s) to represent a current room state (such as in the AR view 200 of FIG. 2)).

In one example, the mobile computing device 141 may be configured to receive certain commands from user 140 in connection with accepting or declining an offer for a room included in the AR content that is presented. For instance, mobile computing device 141 may capture audio input data and perform a speech recognition process to determine if a voice command/voice input is received that expresses a selection of a particular room. In one example, the mobile computing device 141 may further perform a natural language processing (NLP) and/or an intent determination process to determine if the user is selecting a room. In another example, audio data may be captured and then uploaded to server(s) 125, which may then perform the same or similar operations to determine if user 140 has selected a room (and which room is selected). In other words, mobile computing device 141 may be relieved of performing such operations, which are instead performed on the server-side.

In one example, mobile computing device 141 may project a graphical user interface (GUI) within the field-of-view of the user (not shown), and the user may interact with the GUI via gestures to select a room. Similarly, in an example in which the mobile computing device 141 comprises a smartphone or in which the mobile computing device 141 may be paired with a smartphone or the like, user 140 may enter a input via a GUI on the smartphone or similar device to select a room. For instance, a list of rooms within view may be presented via the GUI, from which the user may select a room via a gesture input, may select a room from a list via a touchscreen, and so forth.

In one example, server(s) 125 may update a reservations database, a user database, and/or an AR mapping and content database in response to any input/selection of user 140. For instance, if the user 140 selects room 705, the AR content may be changed to include a text box of "your room" and an arrow pointing to room 705, and may be provided to mobile computing device 141. In addition, mobile computing device 141 may be instructed to remove the previous AR content (e.g., for room 705 and/or for an entire hall of room within view) from a set of displayable AR content in the possession of mobile computing device 141.

In one example, server(s) 125 may disable the "first-level access key," e.g., to the extent the first-level access key may have provided the ability to access any other specific rooms, other floors where the user 140 may have had the ability to choose another room, etc. In one example, a specific access credential may be sent to the user's mobile computing device 141 to enable access to the selected room 705. In addition, server(s) 125 may also revoke the ability of other users to view and to enter the room selected by the user (e.g., room 705). For instance, an instruction may be sent to a smart lock of the door of room 705 to deny access to any other users but user 140 (e.g., by allowing access only with a unique passcode provided to user 140, by allowing access only to user 140 via mobile computing device 141, e.g., via wireless sensing of the IMSI, IMEI, other hardware identifiers, or the like, as an access credential, and so forth). In one example, server(s) 125 may also update a reservation entry for the user in a reservations database and/or a user database.

The foregoing illustrates just several examples of a user's AR experience for management of enclosed spaces within venue 190 (e.g., hotel rooms), including room selection, upgrading, and so forth. Furthermore, the foregoing illustrates just one example of a system in which examples of the present disclosure for presenting visual information comprising imagery of an enclosed space via an augmented reality endpoint device in response to identifying an entryway of the enclosed space within a field of view may operate. In addition, although the foregoing example is described and illustrated in connection with a single mobile computing device 141, a single user 140, etc., it should be noted that various other scenarios may be supported in accordance with the present disclosure. In addition, although FIGS. 1 and 2 appear to illustrate examples primarily in connection with a head-worn AR endpoint device, it should again be noted that the mobile computing device 141 may comprise a mobile smartphone, tablet computing device, or like. In such case, the mobile computing device 141 may be held so as to have an outward facing camera directed toward a field-of-view. The camera may capture imagery, which may then be modified to include AR content and presented via a screen facing the user 140.

It should also be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, one or more operations described above with respect to server(s) 125 may alternatively or additionally be performed by server(s) 112, and vice versa. In addition, although server(s) 112 and 125 are illustrated in the example of FIG. 1, in other, further, and different examples, the same or similar functions may be distributed among multiple other devices and/or systems within the telecommunication network 110, wireless access network(s) 115, and/or the system 100 in general that may collectively provide various services in connection with examples of the present disclosure for presenting visual information comprising imagery of an enclosed space via an augmented reality endpoint device in response to identifying an entryway of the enclosed space within a field of view. In still another example, severs(s) 112 may reside in telecommunication network 110, e.g., at or near an ingress node coupling wireless access network(s) 115 to telecommunication network 110, in a data center of telecommunication network 110, or distributed at a plurality of data centers of telecommunication network 110, etc. Additionally, devices that are illustrated and/or described as using one form of communication (such as a cellular or non-cellular wireless communications, wired communications, etc.) may alternatively or additionally utilize one or more other forms of communication. For instance, in one example, server(s) 125 may communicate with mobile computing device 141, wireless beacons/sensors 170, components (e.g., Internet of Things (IOTs)) within rooms of the venue 190, and other devices at venue 190 via a wireless access point (AP) 122. For instance, server(s) 125 may be owned or operated by the same entity owning or controlling the venue 190, and may have one or more wireless access points, such as AP 122, deployed throughout the venue 190. Thus, communications between server(s) 125 and mobile computing device 141 may not traverse any networks external to the entity. For instance, AP 122 and mobile computing device 141 may establish a session via Wi-Fi Direct, LTE Direct, a 5G D2D sidelink, a DSRC session/pairing, etc. Thus, these and other modifications are all contemplated within the scope of the present disclosure.

FIG. 3 illustrates a flowchart of an example method 300 for presenting visual information comprising imagery of an enclosed space via an augmented reality endpoint device in response to identifying an entryway of the enclosed space within a field of view. In one example, steps, functions and/or operations of the method 300 may be performed by a device or apparatus as illustrated in FIG. 1, e.g., by one or more of server(s) 125, server(s) 112, and/or mobile computing device 141, or any one or more components thereof, or by server(s) 125, servers 112, or mobile computing device 141, and/or any one or more components thereof in conjunction with one or more other components of the system 100, such as elements of wireless access network 115, telecommunication network 110, venue 190, and so forth. In one example, the steps, functions, or operations of method 300 may be performed by a computing device or processing system, such as computing system 400 and/or hardware processor element 402 as described in connection with FIG. 4 below. For instance, the computing system 400 may represent any one or more components of the system 100 that is/are configured to perform the steps, functions and/or operations of the method 300. Similarly, in one example, the steps, functions, or operations of the method 300 may be performed by a processing system comprising one or more computing devices collectively configured to perform various steps, functions, and/or operations of the method 300. For instance, multiple instances of the computing system 400 may collectively function as a processing system. For illustrative purposes, the method 300 is described in greater detail below in connection with an example performed by a processing system. The method 300 begins in step 305 and proceeds to step 310.

At step 310, the processing system detects a first location and a first orientation of an augmented reality endpoint device of a user at a venue. In one example, the location and the orientation of the augmented reality endpoint device are obtained from the augmented reality endpoint device. For instance, the processing system may comprise a server, or servers for an application of a venue operator that obtains the location and orientation information from the augmented reality endpoint device. In another example, the processing system may track the location of the augmented reality endpoint device within the venue, such as via wireless beacons and may obtain the orientation information from the augmented reality endpoint device. In still another example, the processing system may comprise the augmented reality endpoint device itself.

At step 315, the processing system determines whether an entryway of a first enclosed space of the venue is identified within a first field-of-view of the augmented reality endpoint device in accordance with the first location and the first orientation of the augmented reality endpoint device. The entryway may be identified within the field-of-view using a SLAM process on the augmented reality endpoint device or at one or more servers and may utilize visual information from a camera of the augmented reality endpoint device (e.g., in one example in conjunction with the use of AR anchor points), GPS location information, location information from one or more wireless beacons within the venue, orientation data from a gyroscope and compass, altimeter data, and so forth. The entryway may comprise a door, but may alternatively or additionally comprise a door opening, shutters, a curtain, a divider, or other boundaries between the first enclosed space and one or more other spaces (such as a hallway, an outside space, etc.). In one example, the user may have a reservation with the venue for access to a first type of enclosed space, where the first enclosed space is of the first type of enclosed space. For instance, step 315 may include identifying that the first enclosed space is of the first type of enclosed space.

However, in one example, the user does not necessarily have to have a reservation for the type of enclosed space. Rather, the user may be presented with views of any and all available rooms, each of which the user may be permitted to select from within the category of a reservation or as an upgrade option. Similarly, a user without a reservation may also be registered with the venue (and/or an operator thereof) and be verified or otherwise trusted to access AR content pertaining to available rooms. Thus, for example, a user without a reservation may still peruse available rooms, make a selection, and then be granted access, charged for the room accordingly, and so forth.

If an entryway is not identified within the field-of-view (e.g., any entryway, or an entryway for an enclosed space of a relevant category/type of enclosed space), the method 300 may return to step 310. Otherwise, the method may proceed to optional step 320, optional step 325, or step 335. For instance, at optional step 320, the processing system may determine whether the distance from the user (e.g., from the augmented reality endpoint device) to the entryway exceeds a threshold distance. The threshold may be 2 feet, 5 feet, 10 feet, or other distances. In one example, the distance may be inferred based upon a size of the entryway within the field-of-view. In another example, a distance to the entryway may be calculated based upon a relative location of the augmented reality endpoint device with respect to one or more AR anchor points and similarly with respect to the relative location of the entryway. In still another example, LiDAR or a similar ranging measurement may be used to determine the distance. In any case, when the distance exceeds the threshold, the method may proceed to optional step 360. On the other hand, when the distance does not exceed the threshold, the method 300 may proceed to optional step 325 or to step 335.

At optional step 325, the processing system may detect a location of at least one object in the first enclosed space. For instance, as discussed above, objects within a room may have RFID or similar tags such that the current locations and/or orientations of the objects may be detected via RFID readers deployed throughout the venue, or the like.

At optional step 330, the processing system may modify at least one image of the first enclosed space to depict the at least one object at the location that is detected. For instance, optional step 330 may comprise various image processing operations such as described above to insert imagery of the at least one object into the at least one image of the first enclosed space.

At step 335, the processing system presents, via the augmented reality endpoint device, first visual information (e.g., AR content) of the first enclosed space, wherein the first visual information comprises first imagery of the first enclosed space and wherein the first visual information is presented within the first field-of-view. For example, the first imagery of the first enclosed space may be from a perspective of the entryway of the first enclosed space facing into the first enclosed space. For instance, the first imagery may be the same or similar to the example AR view 200 of FIG. 2. In one example, the first imagery of the first enclosed space may comprise the at least one image that is modified at optional step 330. In one example, the presenting of the first visual information of the first enclosed space is performed in response to the identifying at step 315. Similarly, optional steps 325 and 330 may be performed in response to identifying the entryway within the field-of-view (and in one example, further in response to determining at optional step 320 that the distance to the entryway does not exceed the threshold).

In one example, the first visual information may further comprise alphanumeric data regarding the first enclosed space such as: a cost for utilization of the first enclosed space, data describing at least one feature of the first enclosed space, and so forth. In one example, the alphanumeric data may include data describing additional information regarding the first enclosed space that may be accessed via the augmented reality endpoint device. In addition, in one example, the alphanumeric data may further include data describing how to access the additional information regarding the first enclosed space. For instance, the alphanumeric data may provide instructions to the user as to how to access additional information, such as additional photographs of the first enclosed space, information on when the first enclosed space was last occupied, or any other available information not initially presented in connection with the first visual information. In one example, upon receiving a user input in accordance with the instructions, additional data may be presented via the augmented reality endpoint device. The additional information may be audio information or may be visual information that changes the visual information display for the user or that supplements the already presented visual information.

As noted above, in one example, the processing system may comprise the augmented reality endpoint device. In such case, a server may send various data to the augmented reality endpoint device, where the augmented reality endpoint device/processing system may determine its location and orientation, and may then select which AR content to present (e.g., the first visual information of the first enclosed space) from among the AR content already available locally on the AR endpoint device. Alternatively, or in addition, the processing system may transmit its location and orientation information to the server, in response to which the server may provide corresponding AR content for display via the augmented reality endpoint device/processing system. In still another example where the processing system does not comprise the augmented reality endpoint device (e.g., where the processing system comprises one or more AR servers), step 335 may include sending or transmitting the AR content to the augmented reality endpoint device, e.g., with instructions as to when and where within the field-of-view to present the AR content.

At optional step 340, the processing system whether an input from the user selecting to access the first enclosed space is received. The input may comprise, for example, a voice command, a gesture input, pressing a button via a GUI and touchscreen of an accompanying smart phone, and so forth. The input may be interpreted on the augmented reality endpoint device or at a server of the processing system depending upon the architecture implemented for a particular example in connection with the method 300. In one example, the input may be the user entering the first enclosed space via the entryway. For instance, the first enclosed space may allow the user to physically enter using a first-level access key, after which the first enclosed space may then be reserved for the user (and the user's ability to enter other similar enclosed spaces may be revoked).

When the input is received at optional step 340, the method 300 may proceed to optional step 345 or optional step 350, or may proceed to step 395. For instance, optional step 345 may be performed in an example in which the processing system comprises one or more servers in communication with the AR endpoint device. In particular, optional step 345 may include providing, to the augmented reality endpoint device or a mobile computing device associated with the augmented reality endpoint device, an access credential for accessing the first enclosed space. The access credential my comprise, for example, a passcode/key code to be entered manually by the user via a touchscreen or keypad, an electronic passcode/key code to be presented wirelessly by the augmented reality endpoint device or mobile computing device to a smart lock (e.g., having a wireless receiver) of the first enclosed space, and so forth.

On the other hand, optional steps 350 and 355 may be performed in an example in which the processing system comprises the augmented reality endpoint device. For instance, at optional step 350, the processing system may provide the input to at least one server associated with the venue. Thereafter, at optional step 355, the processing system may obtain, from the at least one server, an access credential for accessing the enclosed space (e.g., where the access credential may be as noted above). Following step 335 or any of optional steps 340-355, the method 300 may proceed to step 395 where the method 300 ends.

Returning again to step 310, in a different example, or at an earlier or later time, the processing system may detect a second location and a second orientation of the augmented reality endpoint device of the user at the venue. At step 315, the processing system may determine that an entryway of the first enclosed space of the venue is within a second field-of-view of the augmented reality endpoint device in accordance with the second location and the second orientation of the augmented reality endpoint device. In addition, at optional step 320, the processing system may determine that the entryway of the first enclosed space is beyond a threshold distance from the augmented reality endpoint device. For example, the processing system may determine that the augmented reality endpoint device is on a hallway having the entryway to the first enclosed space, but where the entryway is too far away to present an in-room view from the perspective of the entryway. For instance, the example field-of-view 195 of FIG. 1 is illustrative of such a scenario. When it is determined that the entryway of the first enclosed space is beyond a threshold distance from the augmented reality endpoint device (but is within the field-of-view) the method 300 may proceed to optional step 360.

At optional step 360, the processing system may present, via the augmented reality endpoint device, second visual information of the first enclosed space, wherein the second visual information is presented within the second field-of-view as an overlay on or proximate to the entryway. The second visual information may be a general photograph of the room or a photograph illustrative of the room type, may include the same or different alphanumeric data as compared to the alphanumeric data that may be presented as part of the first visual information at step 335, and so on.

At optional step 365, the processing system may present third visual information regarding at least a second enclosed space of the venue. For instance, an entryway of the at least the second enclosed space may be within the second field-of-view of the augmented reality endpoint device, such as illustrated in the example of FIG. 1.

Following optional step 360 or optional step 365, the method 300 may proceed to optional step 340. For instance, the user may provide an input to select the first enclosed space (or the second enclosed space or other enclosed space) without obtaining an in-room view from the perspective of the entryway of such enclosed space. However, if no such input is received, the method 300 may return to step 310 and to continue to detect the location and orientation of the augmented reality endpoint device, identify entryways within the field-of-view, present corresponding AR content, and so on. It is again noted that following step 335 or any of optional steps 340-355, the method 300 may proceed to step 395 where the method 300 ends.

It should be noted that the method 300 may be expanded to include additional steps, or may be modified to replace steps with different steps, to combine steps, to omit steps, to perform steps in a different order, and so forth. For instance, in one example, the processing system may repeat one or more steps of the method 300, such as step 310-335 and/or steps 310-365 on an ongoing basis as the user moves throughout the venue, and similarly for multiple users at the same venue, and so forth. In one example, the method 300 may further include the processing system obtaining images of enclosed spaces, extracting moveable items/objects from such images, creating object models for the items/objects, and so forth, e.g., as described above. In one example, the method may include obtaining a user reservation for the type of enclosed space of the first enclosed space (e.g., a room type at a hotel, a type of booth at a theater, arena, stadium or the like, and so on). In one example, the method 300 may further include updating a reservations database and/or a user database in accordance with the user's selection of the first enclosed space in connection with optional step 340.

In still another example in which the processing system comprises the AR endpoint device, the method 300 may instead comprising obtaining location data and orientation data, and providing such data to the server(s), which may identify the relevant AR content and provide the AR content to the AR endpoint device for the AR endpoint device to present. In other words, more or less of the functions may be offloaded to the server(s), and vice versa. For instance, in another example in which the processing system comprises one or more server(s), more or less functions may be offloaded to the AR endpoint device, such as detecting the location and orientation of the AR endpoint device, and identifying the entryway within the field-of-view, wherein the server(s) may still select which AR content to provide in response to the preceding steps. However, in another example, the server(s) may previously have provided the AR endpoint device with AR content corresponding to the first enclosed space (and perhaps multiple enclosed spaces, such as rooms on the same hallway, for example). In this case, the AR endpoint device may detect the entryway and retrieve the corresponding AR content available locally from memory on the AR endpoint device. Thus, various distributions of functions between the AR endpoint device and one or more server(s) may be employed in different configurations in accordance with the present disclosure. In various other examples, the method 300 may further include or may be modified to comprise aspects of any of the above-described examples in connection with FIG. 1 or 2, or as otherwise described in the present disclosure. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 4 depicts a high-level block diagram of a computing system 400 (e.g., a computing device or processing system) specifically programmed to perform the functions described herein. For example, any one or more components, devices, and/or systems illustrated in FIG. 1 or described in connection with FIGS. 2 and 3, may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where the hardware processor element 402 may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for presenting visual information comprising imagery of an enclosed space via an augmented reality endpoint device in response to identifying an entryway of the enclosed space within a field of view, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 402 is shown, the computing system 400 may employ a plurality of hardware processor elements. Furthermore, although only one computing device is shown in FIG. 4, if the method(s) as discussed above is implemented in a distributed or parallel manner for a particular illustrative example, e.g., the steps of the above method(s) or the entire method(s) are implemented across multiple or parallel computing devices, then the computing system 400 of FIG. 4 may represent each of those multiple or parallel computing devices. Furthermore, one or more hardware processor elements (e.g., hardware processor element 402) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 405 for presenting visual information comprising imagery of an enclosed space via an augmented reality endpoint device in response to identifying an entryway of the enclosed space within a field of view (e.g., a software program comprising computer-executable instructions) can be loaded into memory 404 and executed by hardware processor element 402 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 402) executing the computer-readable instructions relating to the above described method(s) can be perceived as a programmed processor or a specialized processor. As such, the present module 405 for presenting visual information comprising imagery of an enclosed space via an augmented reality endpoint device in response to identifying an entryway of the enclosed space within a field of view (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:
1. A method comprising:
detecting, by a processing system including at least one processor, a first location and a first orientation of an augmented reality endpoint device of a user at a venue;
identifying, by the processing system, an entryway of a first enclosed space of the venue that is within a first field-of-view of the augmented reality endpoint device in accordance with the first location and the first orientation of the augmented reality endpoint device;
detecting, by the processing system, a location of at least one object within the first enclosed space, wherein the location of the at least one object is detected via a wireless sensing of at least one wireless tag of the at least one object;
modifying, by the processing system, at least one prior captured image of the first enclosed space to generate a first imagery of the first enclosed space that depicts the at least one object at the location that is detected, wherein the modifying comprises:
extracting visual data of the at least one object from the at least one prior captured image;
infilling, via a machine learning-based process, a portion of the at least one prior captured image from which the visual data of the at least one object is extracted to generate an infilled image; and inserting imagery of the at least one object into the infilled image in accordance with the location that is detected, to generate the first imagery of the first enclosed space, wherein the imagery of the at least one object is based on the visual data of the at least one object that is extracted; and presenting, by the processing system via the augmented reality endpoint device, first visual information of the first enclosed space, wherein the first visual information comprises the first imagery of the first enclosed space and wherein the first visual information is presented within the first field-of-view.

2. The method of claim 1, wherein the user has a reservation with the venue for access to a first type of enclosed space, wherein the first enclosed space is of the first type of enclosed space.

3. The method of claim 2, wherein the identifying includes identifying that the first enclosed space is of the first type of enclosed space.

4. The method of claim 3, wherein the presenting the first visual information of the first enclosed space is performed in response to the identifying.

5. The method of claim 1, wherein the processing system is in communication with the augmented reality endpoint device, the method further comprising:
receiving an input from the user selecting to access the first enclosed space; and
providing, to the augmented reality endpoint device or a mobile computing device associated with the augmented reality endpoint device, an access credential for accessing the first enclosed space.

6. The method of claim 1, wherein the processing system comprises the augmented reality endpoint device, the method further comprising:
receiving an input from the user selecting to access the first enclosed space; and
providing the input to at least one server associated with the venue.

7. The method of claim 6, further comprising:
obtaining, from the at least one server, an access credential for accessing the first enclosed space.

8. The method of claim 1, wherein the first visual information further comprises alphanumeric data regarding the first enclosed space.

9. The method of claim 8, wherein the alphanumeric data comprises at least one of:
a cost for utilization of the first enclosed space;
data describing at least one feature of the first enclosed space; or
data describing additional information regarding the first enclosed space that can be accessed via the augmented reality endpoint device.

10. The method of claim 9, wherein the alphanumeric data further includes data describing how to access the additional information regarding the first enclosed space.

11. The method of claim 1, wherein the first imagery of the first enclosed space is from a perspective of the entryway of the first enclosed space facing into the first enclosed space.

12. The method of claim 1, further comprising:
detecting a second location and a second orientation of the augmented reality endpoint device of the user at the venue;
identifying that the entryway of the first enclosed space of the venue is beyond a threshold distance from the augmented reality endpoint device and is within a second field-of-view of the augmented reality endpoint device in accordance with the second location and the second orientation of the augmented reality endpoint device; and
presenting, via the augmented reality endpoint device, second visual information of the first enclosed space, wherein the second visual information is presented within the second field-of-view as an overlay on or proximate to the entryway.

13. The method of claim 12, further comprising:
presenting third visual information regarding at least a second enclosed space of the venue.

14. The method of claim 13, wherein an entryway of the at least the second enclosed space is within the second field-of-view of the augmented reality endpoint device.

15. The method of claim 1, wherein the first location and the first orientation of the augmented reality endpoint device are obtained from the augmented reality endpoint device.

16. The method of claim, 1 wherein the entryway of the first enclosed space is identified within the first field-of-view of the augmented reality endpoint device in accordance with at least one augmented reality anchor point of the venue.

17. A non-transitory computer-readable medium storing instructions which, when executed by a processing system including at least one processor, cause the processing system to perform operations, the operations comprising:
detecting a first location and a first orientation of an augmented reality endpoint device of a user at a venue;
identifying an entryway of a first enclosed space of the venue that is within a first field-of-view of the augmented reality endpoint device in accordance with the first location and the first orientation of the augmented reality endpoint device;
detecting a location of at least one object within the first enclosed space, wherein the location of the at least one object is detected via a wireless sensing of at least one wireless tag of the at least one object;
modifying at least one prior captured image of the first enclosed space to generate a first imagery of the first enclosed space that depicts the at least one object at the location that is detected, wherein the modifying comprises:
extracting visual data of the at least one object from the at least one prior captured image;
infilling, via a machine learning-based process, a portion of the at least one prior captured image from which the visual data of the at least one object is extracted to generate an infilled image; and
inserting imagery of the at least one object into the infilled image in accordance with the location that is detected, to generate the first imagery of the first enclosed space, wherein the imagery of the at least one object is based on the visual data of the at least one object that is extracted; and
presenting, via the augmented reality endpoint device, first visual information of the first enclosed space, wherein the first visual information comprises the first imagery of the first enclosed space and wherein the first visual information is presented within the first field-of-view.

18. An apparatus comprising:
a processing system including at least one processor; and
a computer-readable medium storing instructions which, when executed by the processing system, cause the processing system to perform operations, the operations comprising:

detecting a first location and a first orientation of an augmented reality endpoint device of a user at a venue;

identifying an entryway of a first enclosed space of the venue that is within a first field-of-view of the augmented reality endpoint device in accordance with the first location and the first orientation of the augmented reality endpoint device;

detecting a location of at least one object within the first enclosed space, wherein the location of the at least one object is detected via a wireless sensing of at least one wireless tag of the at least one object;

modifying at least one prior captured image of the first enclosed space to generate a first imagery of the first enclosed space that depicts the at least one object at the location that is detected, wherein the modifying comprises:

extracting visual data of the at least one object from the at least one prior captured image;

infilling, via a machine learning-based process, a portion of the at least one prior captured image from which the visual data of the at least one object is extracted to generate an infilled image; and inserting imagery of the at least one object into the infilled image in accordance with the location that is detected, to generate the first imagery of the first enclosed space, wherein the imagery of the at least one object is based on the visual data of the at least one object that is extracted; and presenting, via the augmented reality endpoint device, first visual information of the first enclosed space, wherein the first visual information comprises the first imagery of the first enclosed space and wherein the first visual information is presented within the first field-of-view.

19. The apparatus of claim 18, wherein the user has a reservation with the venue for access to a first type of enclosed space, wherein the first enclosed space is of the first type of enclosed space.

20. The apparatus of claim 19, wherein the identifying includes identifying that the first enclosed space is of the first type of enclosed space.

* * * * *